(12) United States Patent
Casebier

(10) Patent No.: US 7,686,956 B1
(45) Date of Patent: Mar. 30, 2010

(54) WATER PURIFICATION SYSTEM FOR STORM DRAIN CHANNELS

(76) Inventor: Kenneth Casebier, 6643 Kentwood Bluffs Dr., Los Angeles, CA (US) 90045

( * ) Notice: Subject to any disclaimer, the term of this patent is extended or adjusted under 35 U.S.C. 154(b) by 443 days.

(21) Appl. No.: 11/438,643

(22) Filed: May 22, 2006

(51) Int. Cl.
C02F 3/32 (2006.01)

(52) U.S. Cl. .................. 210/602; 210/170.03; 210/259

(58) Field of Classification Search ................ 210/602, 210/747, 170.03, 252, 259, 912
See application file for complete search history.

(56) References Cited

U.S. PATENT DOCUMENTS

| | | | | |
|---|---|---|---|---|
| 1,797,697 | A * | 3/1931 | Rymal | 210/539 |
| 3,770,623 | A * | 11/1973 | Seidel | 210/602 |
| 4,030,359 | A * | 6/1977 | Stapler | 73/861.92 |
| 4,457,646 | A * | 7/1984 | Laesch | 405/52 |
| 5,000,852 | A * | 3/1991 | Tel-Or et al. | 210/602 |
| 5,389,257 | A * | 2/1995 | Todd et al. | 210/602 |
| 5,393,426 | A * | 2/1995 | Raskin et al. | 210/602 |
| 5,702,593 | A * | 12/1997 | Horsley et al. | 210/122 |
| 5,893,975 | A * | 4/1999 | Eifert | 210/602 |
| 5,951,866 | A * | 9/1999 | Grove et al. | 210/602 |
| 6,129,844 | A | 10/2000 | Dobelmann | |
| 6,248,233 | B1 * | 6/2001 | Priggemeyer et al. | 210/162 |
| 6,277,274 | B1 * | 8/2001 | Coffman | 210/150 |
| 6,379,543 | B1 * | 4/2002 | Bowman | 210/170.03 |
| 6,413,426 | B1 | 7/2002 | DeBusk et al. | |
| 6,467,994 | B1 * | 10/2002 | Ankeny et al. | 405/37 |
| 6,755,972 | B1 * | 6/2004 | Kouloumbis | 210/602 |
| 2003/0111409 | A1 * | 6/2003 | Austin et al. | 210/602 |
| 2003/0230529 | A1 * | 12/2003 | Austin et al. | 210/602 |
| 2004/0173522 | A1 * | 9/2004 | Allard | 210/602 |

FOREIGN PATENT DOCUMENTS

JP 2002-102884 * 4/2002

* cited by examiner

*Primary Examiner*—Fred Prince
(74) *Attorney, Agent, or Firm*—Frederick Gotha

(57) ABSTRACT

The invention is directed to a water purification system to remove pollutants from surface run-off water that has flowed into storm water drainage channels. A tank having an open reservoir region is positioned in the drainage channel or adjacent to the channel so as to permit water to flow through an upstream port of the tank and pool within the open reservoir region. The tank has a downstream port through which water pooled within the reservoir region may flow if the level of the pooled water sufficiently increases as a result of a rise in the flow level of the water in the drainage channel. The open reservoir region contains bioremediation plants having the physical property of removing pollutants from the pooled run-off water contained in the reservoir region.

20 Claims, 5 Drawing Sheets

FIG. 3
FIG. 4
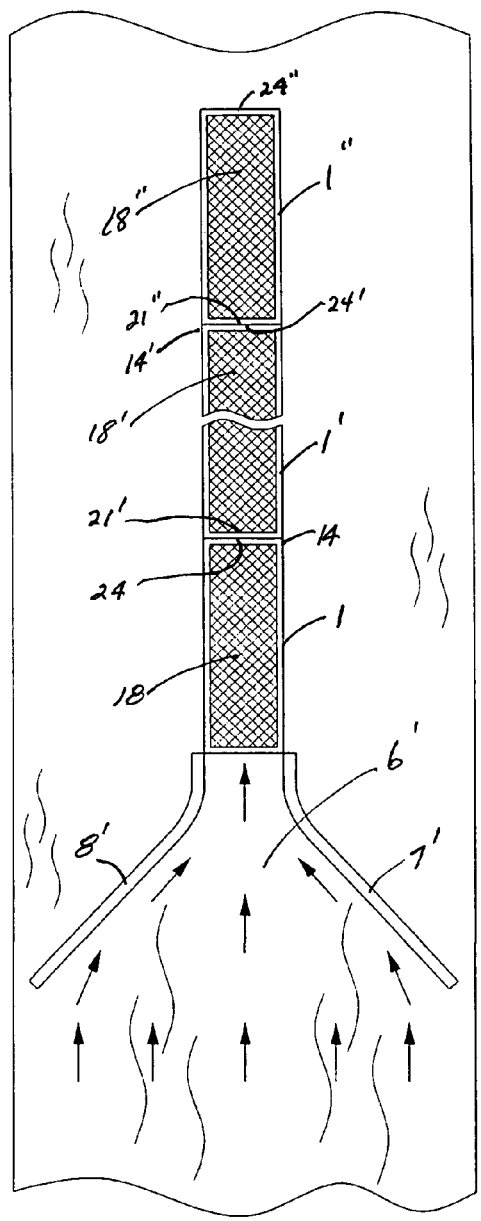
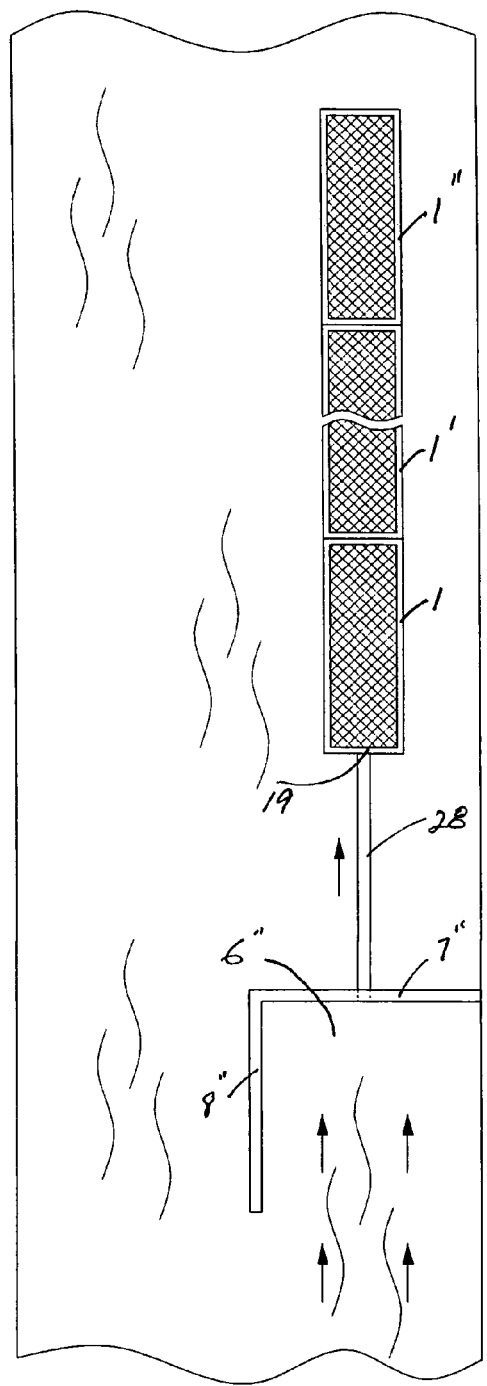

WATER PURIFICATION SYSTEM FOR STORM DRAIN CHANNELS

FIELD OF THE INVENTION

This invention relates to a water purification system for the removal of pollutants by bioremediation from runoff water that has entered into storm drain channels.

BACKGROUND OF THE INVENTION

Storm drain channels are ordinarily man-made for the purpose of channeling rain water to prevent flooding of urban areas. The drains, however, are one of the primary causes of pollutants entering into rivers and coastal ocean environments. In the City of Los Angeles, for example, storm water and urban runoff from streets are funneled down street gutters to catch-basins which are inlets to a fifteen-hundred mile maze of pipes, open channels, and outlets that carry the water to the ocean, bays, and coastal wetlands. The runoff is not treated before entering these areas and consequently pollutants are carried directly into the river and ocean environment with a deleterious affect not only on marine, sea and plant life, but also on the public enjoyment of the natural environment in these areas.

The emphasis to minimize the amount of pollutants entering into the drainage channels has been placed upon individuals and upon their activities in relationship to their business and homes. Conservation methods are recommended by governmental and environmental groups to keep water out of gutters, to not over water lawns or gardens, to purchase less toxic gardening and household products, and many other suggested ways of minimizing the entrance of pollutants into the storm drain system. These methods, however, do not address treatment of the runoff water after pollutants enter the system. It would therefore be advantageous to have a water purification system in the storm drain channels that would supplement prior individual purification efforts by removing pollutants that have nevertheless entered into the system despite the preventative environmental measures taken by individuals and communities. The system of this invention presents an ecologically compatible system for minimization of pollutants at a low cost with minimal maintenance and long term benefits to the environment.

SUMMARY OF THE INVENTION

There is, therefore, provided according to the present invention, a water purification system for removing pollutants form surface runoff water that has entered into an open drainage channel where the drainage channel is graded with pre-determined slopes for carrying the surface runoff water to the ocean, bay, lake, or river.

The present invention is directed to a phytoremediation water purification system that is associated with a storm water drainage channel for receiving the runoff water and allowing the water to pool in an open reservoir region containing a biomass of floating, submerged, or suspended bioremediation plants which include plants having the physical property of absorbing pollutants from the pooled water. Floating vascular plants such as the water hyacinth, an aquatic macrophyte, which absorb organic and inorganic materials through their root systems, may be utilized in the embodiments of this invention for removing pollutants. Other species of aquatic macrophytes, such as duckweed (*Lemna minor*), water velvet (*Azolla pinnata*), *Lemna gibba*, *Azolla filiculoides*, *Elodea densa*, *Elodea camadensis*, *Pistia stratiotes* and *Ceratophyllum demersum*, may also be used in the embodiments of this invention for removing pollutants by absorbing organic and inorganic pollutant materials from water. In addition to aquatic macrophytes, other species of bioremediation plants having the physical property of removing pollutants from pooled water may be utilized either alone or in combination with aquatic macrophytes in the embodiments of this invention.

In one embodiment of the invention, a tank or culvert has an axis of elongation, a laterally extending upstream wall, a laterally extending downstream stream wall axially removed from the upstream wall and in fixed spatial relationship therewith and a bottom wall, where a pair of axially extending sidewalls interconnect the upstream and downstream walls and bottom wall forming an open reservoir region within the tank. The upstream wall has an inlet port communicating with the reservoir region to permit the flow of at least a part of the water flowing in the drainage channel into the reservoir region. To permit the water within the reservoir region to pool during non-storm conditions, the downstream wall has an outlet port which is in fixed spaced relationship with and located above the inlet port. A plurality of floating, suspended or submerged bioremediation plants are so disposed within the reservoir region such that organic and inorganic pollutants contained in the pooled water are absorbed by the plants from the water before it is discharged into the drainage channel through the outlet port. A sufficient raising of the water level within the drainage channel resulting from subsequent rain and surface runoff water flooding into the channel will force the pooled water to flow within the reservoir region and to flow through the outlet port of the downstream wall of the tank. Thus, the bioremediation plant treated water flows back into the drainage channel for drainage downstream and ultimately to the ocean, bay, lake, or river. To shield plants and to contain them within the reservoir region during high water periods, the plants are anchored or a screen mesh covers the open reservoir region where the mesh openings are sufficiently dimensioned and proportioned to permit sunlight to pass therethrough.

In another embodiment of this invention, the tank or culvert may be positioned adjacent to but outside of the stream flow within the drainage channel. In this embodiment, a conduit is so disposed in the stream flow within the drainage channel so as to capture run-off water flowing in the channel and transport the water to the inlet port of the tank.

In yet another embodiment of the system of this invention, a series of tanks or culverts are so disposed within the drainage channel water flow such that the open reservoir regions of each tank are in fluid communication with each other and the inlet and outlet ports so positioned in each tank to permit a pooling of the water to a pre-determined height in each reservoir region thereby permitting plant bioremediation treatment of the pooled water in each of the tanks before the treated water is returned to the drainage channel by storm conditions that raise the water level in the channel and force the flow of the pooled water in the tanks through successive inlet and outlet ports of the tanks.

It is also contemplated that in each of the embodiments of the systems of this invention that a damming region may be constructed within the drainage channel to funnel at least a portion of the water flow within the drainage channel to the inlet port of the upstream tank if the tanks are in series. The damming region may contain funnel arms that span the width of the drainage channel or at least a part thereof to capture and direct the stream flow in the channel into the damming region for subsequent passage through the inlet port of the upstream tank.

BRIEF DESCRIPTION OF THE DRAWINGS

These and other features and advantages will become appreciated as the same become better understood with reference to the following specification, claims and drawings wherein:

FIG. 3 is a top view of an embodiment of this invention illustrating a series of individual systems as shown in FIG. 1 disposed within an open drainage channel where the stream flow is dammed and funneled into the purification system.

FIG. 4 is a top view of the series of systems as illustrated in FIG. 3 where an alternative dam and funnel design is shown for directing surface runoff water flowing in the open drainage channel into the series of purification systems.

DETAILED DESCRIPTION

The water purification system of this invention acts upon surface runoff water that runs into storm drains which feed drainage channels that deliver pollutants contained in surface runoff water to rivers, bays, coastal wetlands, and oceans. These drains and drainage channels are generally associated with urban areas where storm water drains along surface streets and into catch basins from where it is directed into the drainage channels. The drainage channels are so constructed to permit a continuous flow to a river, coastal wetland, or the ocean. The slope or inclination of the channel bottom with respect to the horizontal is pre-determined for gravitational flow and the flow is generally non-uniform as a result of changing slopes and cross-sectional areas of the channels. Pollutants and toxic chemicals are washed by water from the streets, lawns, factories, and infra-structures of urban areas directly into the drainage channels and are eventually discharged into rivers, coastal wetlands, and the oceans. It is therefore an object of this invention to purify by phytoremediation at least in part a portion of the runoff water that has entered into the drainage channels and has accumulated during non-storm conditions so as to create an ecological, long-term, low-cost, low-maintenance solution to the pollution problem associated with runoff water that has entered into the flood control drainage channels.

Figure 1:
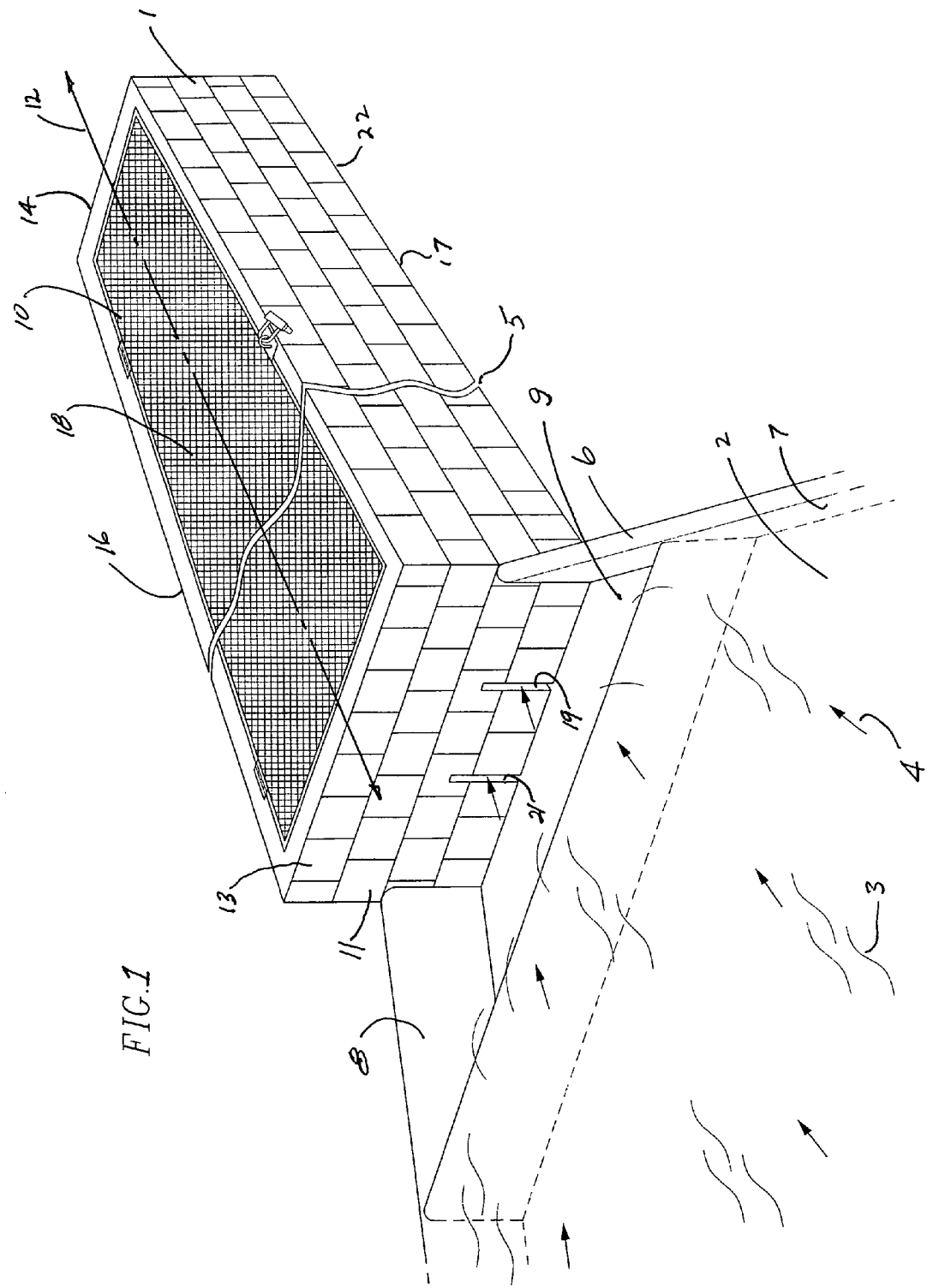
FIG. 1 is a perspective view of the water purification system of this invention positioned in the free stream flow of an open drainage channel.
Figure 2:
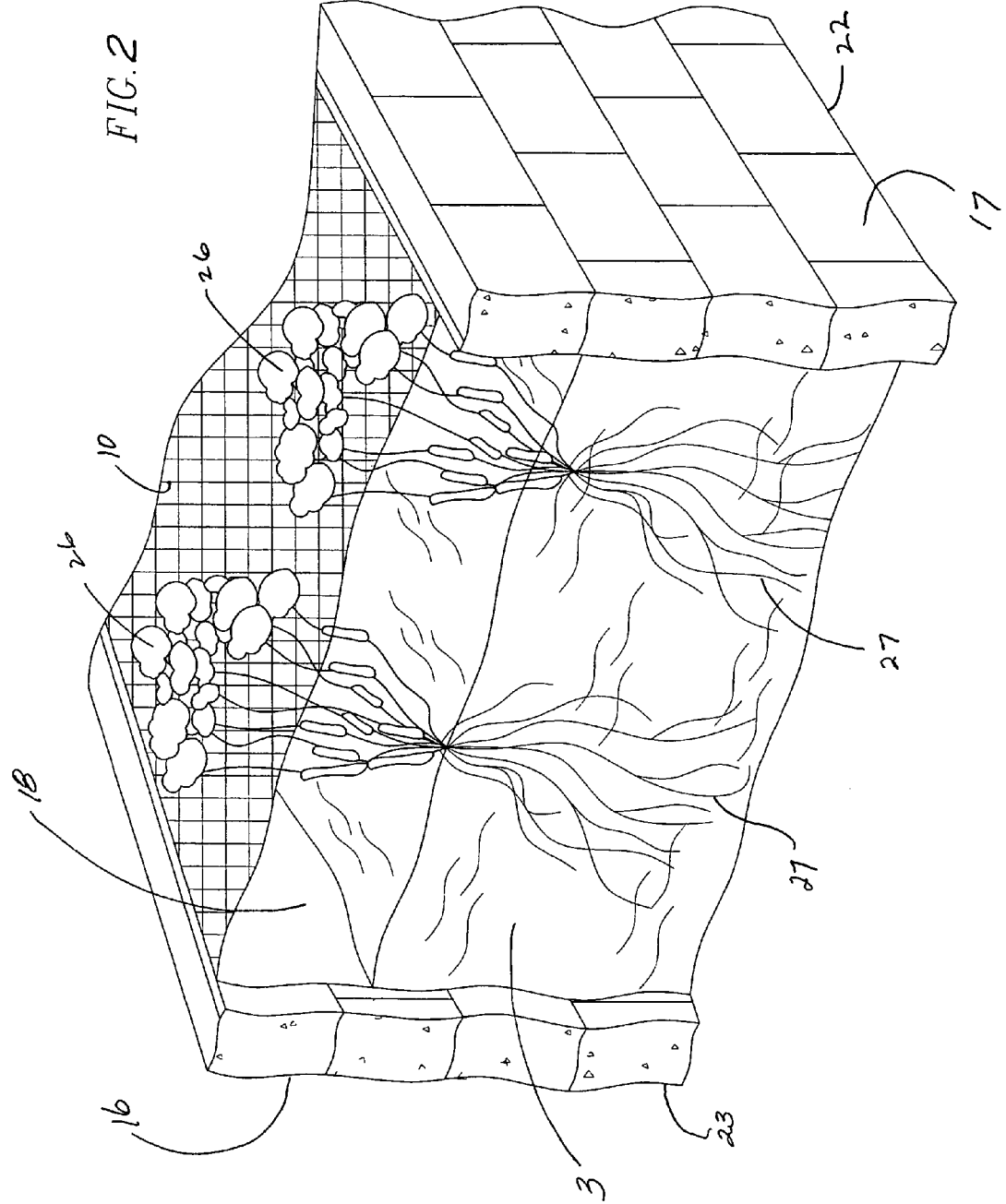
FIG. 2 is a part-sectional view of the water purification system shown in FIG. 1 illustrating a phytoremediation plant such as a floating hyacinth positioned in the reservoir region of the water purification system.

The system of this invention is shown in perspective in FIGS. 1 and 2. As can be seen in FIG. 1, a tank or culvert 1 is positioned within a drainage channel 2 where surface runoff water 3 is flowing within drainage channel 2 in the direction depicted by arrows 4. In the preferred embodiment of this invention, tank or culvert 1 is made of cinder blocks cemented together forming a sealed structure. In other embodiments, the tank or culvert may be a pipe or an open trough made of a rustproof material. A dam 6 having funnel arms 7 and 8 is situated in the flow stream depicted by arrows 4 to direct the flow into a collecting region 9 at the upstream end 11 of tank 1. As can further be seen by reference FIG. 1, tank 1 has an axis of elongation 12 extending in the direction of the flow stream and the bottom of the tank 1 has a slope that is so dimensional to permit gravitational flow of the runoff water in a downstream direction. At the upstream-end 11 of tank 1, an upstream wall 13 forms an integral part of the structure of tank 1 which further includes a downstream wall 14 and interconnecting sidewalls 16 and 17 and can more easily be seen by reference to FIG. 2 which is a sectional view of tank 1.

The flow of surface runoff water 3 into reservoir region 18 may be seen by referring to upstream end 11 of tank or culvert 1. Inlet ports 19 and 21 which appear as slits in FIG. 1 may vary in vertical height and width but are so dimensioned and designed to communicate with reservoir region 18 to permit the flow of water into the tank. Although not shown in the drawings, the bottom of surface drainage channel 2 is downwardly sloped to permit a continuous flow. The bottom slopes 22 and 23 (shown in FIG. 2) of sidewalls 16 and 17 are so dimensioned and proportioned so as to permit a continuous flow relationship within the reservoir approximating that of the bottom surface slope of drainage channel 2. Consequently, water entering into reservoir region 18 through inlet ports 19 and 21 will flow toward downstream wall 14. An outlet port 24 (shown in FIG. 6) extends through downstream wall 14 and is located at a vertical height above inlet ports 19 and 21; outlet port 24 communicates with reservoir region 18 and permits water which has pooled within reservoir region 18 to flow from tank 1 into drainage channel 2. The vertical separation of outlet port 24 with respect to the inlet port will depend upon the length and height of the side walls and bottom slope of tank 1. In extended non-storm conditions, water which has pooled within reservoir region 18 will be stationary. It is during the stationary period of the pooled water that the purification process takes place as is hereafter described by reference to FIG. 2.

FIG. 2 illustrates a plurality of phytoremediation plants or floating vascular plants (FVP's) such as a *Eichornia crassipes* (floating water hyacinth plant) 26, having a root portion 27 disposed in water that has pooled within reservoir region 18. phytoremediation plants such as water hyacinths are known for their water purification properties, namely, they are known to remove both organic and inorganic waste from water. Within the roots of phytoremediation plants such as water hyacinths, the bioremediation process occurs when denitrifying bacteria aid to oxidize inorganic nitrogen to gaseous molecular nitrogen that is released into the atmosphere and metals are absorbed. Thus, the presence of an aquatic macrophyte plant such as a water hyacinth or other species of aquatic macrophytes either alone or in combination with other biomass in the pooled water contained in reservoir region 18 have the physical property of removing certain of the pollutants that have accumulated in the pooled water during non-storm conditions. When flooding conditions occur, the purified water will be pushed through the downstream outlet port 24 of tank or culvert 1 and flow gravitationally down the drain channel into the environment thus minimizing the amount of pollution carried by surface runoff water into oceans, rivers, wetlands, and coastal areas. In order to increase the quantity of runoff water treatable by the system this invention, tank modules 1, 1', and 1" may be placed in series and located in the drainage channel or adjacent thereto as shown in the alternative embodiments of the water purification system illustrated in FIGS. 3, 4, 5, and 6.

To prevent the bioremediation plants from being washed away by flood water, the plants are either anchored in tank 1 or a wire mesh screen 10 is hinged to a sidewall 16 or to both sidewalls to provide access to reservoir region 18 and to retain the plants. The mesh is so dimensioned and proportioned to shield the reservoir region from flood debris and to permit surface or submerged plants to grow through it, and also to admit sunlight to the reservoir FIG. 3 illustrates an array of tanks 1, 1' and 1" in series where the outlet port 24 of tank 1 located in downstream wall 14 communicates with inlet port 21' of tank 1' and consequently with reservoir region 18'. Likewise, outlet port 24' located in downstream wall 14' communicates with inlet port 21" of tank 1".

Because of the downslope of the drainage channel bottom, the location of the outlet ports and inlet ports of tanks 1' and 1" will determine the height to which water will be permitted to pool in the respective tanks. Water will pool in tank 1 and until it reaches the height of outlet port 24 and will pool likewise to the height of outlet port 24' in tank 1' and to the height of outlet port 24" in tank 1". These heights are predetermined based upon the bottom slope of the drainage channel and the vertical height and axial length of the tank. Where the bottom slope of the drainage channel is relatively steep, the succeeding upstream and downstream walls will be higher than those of a previous tank in the series.

The identical series of tanks is shown in FIG. 4. Although these tanks have been shown in the drawing in series of three, the array may include more than three tanks. Dam 6 shown in FIG. 3, has funnel arms 7' and 8' that angularly extend laterally across the drainage channel to capture and dam a greater quantity of the water for pooling in the reservoir regions 18, 18', 18" contained in the series array of the tanks. FIG. 4 illustrates an alternative method of damming the water flow and utilizing conduit 28 to deliver the dammed water to inlet port 19.

Although funnel arms 7" and 8" are shown to be essentially orthogonal in FIG. 4, alternative angular relationships for funnel arms 7" and 8" would be effective to direct flow water into dam 6" from which the water would be directed through conduit 28 to input port 19.

Figure 5:
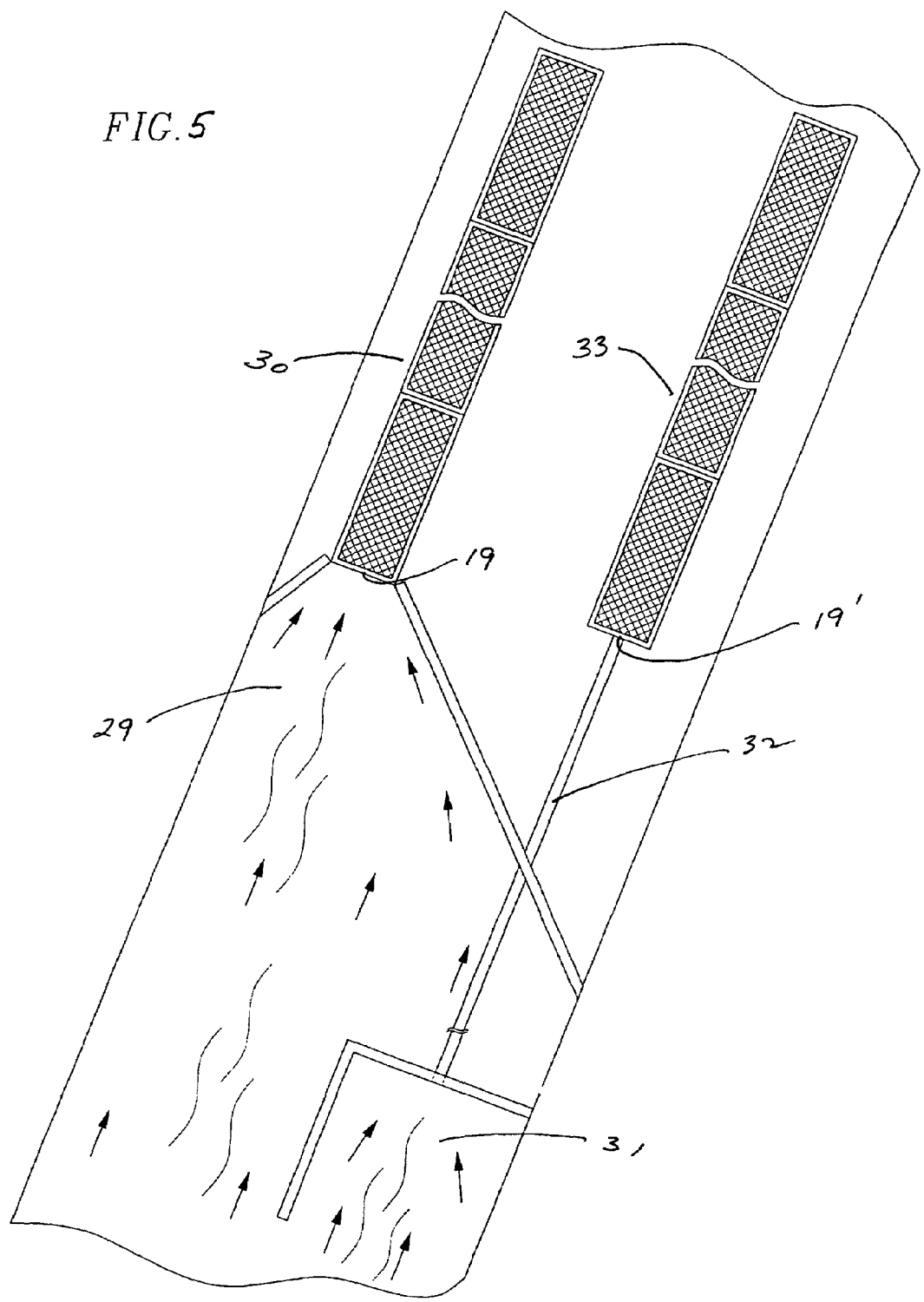
FIG. 5 is a top view of another embodiment of the water purification system of this invention illustrating systems in series disposed in the stream flow within the open drainage channel.

In FIG. 5, a dual arrangement of the purification system of this invention is illustrated where a parallel series of tanks described in FIGS. 1 and 2 utilize a dam system that spans drainage channel 2 laterally such that part of the flow is directed into dam 29 and thereafter directed to inlet port 19 of the first tank series 30; the remaining portion of the flow entering dam 31 is directed into conduit 32 for passage to inlet port 19' of the tank series 33. The structure of tank series 30 and 33 has been described in FIGS. 3 and 4 along with the dependence of the pooling heights upon the slope of the drainage channel and the length and height of the tanks and is incorporated into the description of the tank series illustrated in FIG. 5.

Figure 6:
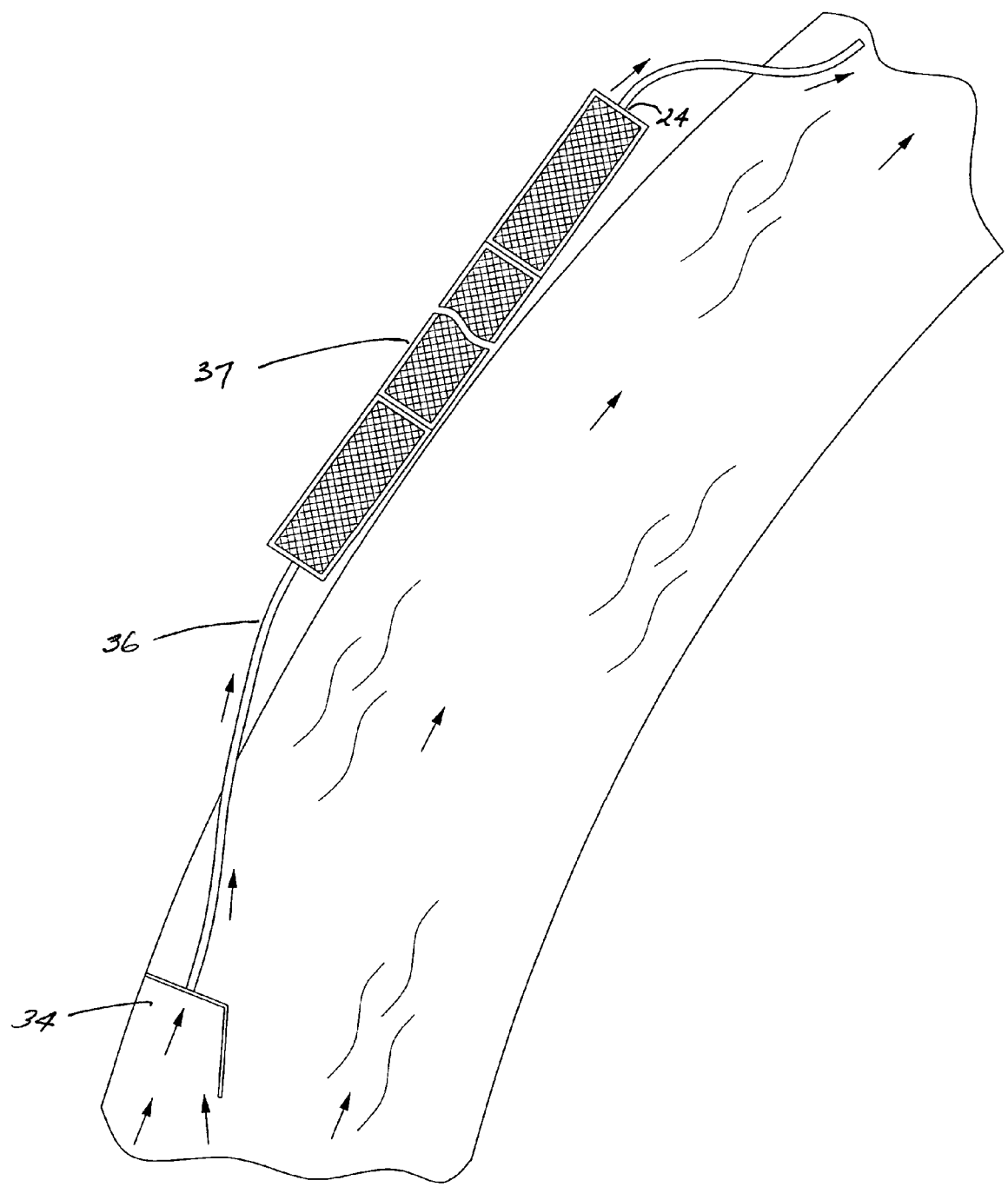
FIG. 6 is an another embodiment of this invention illustrating the water purification system where the treatment of the surface runoff water occurs outside of and adjacent to the drainage channel.

Another embodiment of the system of this invention is illustrated in FIG. 6. Although FIG. 6 depicts a series of tanks, a single tank of the type described in FIGS. 1 and 2 could also be utilized. The embodiment shown in FIG. 6 illustrates an alternate positioning of tanks 1, 1', and 1" outside of and adjacent to the drainage channel where water is diverted from the drainage channel by conduit to the tanks. As can be seen in FIG. 6, dam 34 directs flow water into a conduit 36 that carries the water to a series of tanks 37 which are located outside the drainage channel. In the same manner as above shown and described in FIGS. 1, 2, 3, 4, and 5, water pools in the reservoir regions of the tanks containing bioremediation plants. Some of the pollutants contained in the pooled water will be removed by the bioremediation plants which may be a combination of submerged, anchored biomass or floating aquatic macrophytes in the water and when subsequent storms-flood the drainage channels, the purified water in the reservoir region will be forced to flow through the outlet port of the tanks into another of the tanks in series and eventually from the most downstream tank directly into the drainage channel for carriage to the ocean, wetland, or bay. Although aquatic macrophytes having the property of removing pollutants from the pooled water have been described above, other plants having this same property may also be used. Since the drainage channel carries the purified water to an ocean, bay, river, or wetland, the bioremediation plant should be of a species that cannot survive in salt water to protect the ocean environment.

While I have shown and described embodiments of a water purification system for surface runoff water that has entered into a drainage channel, it is to be understood that the system invention is subject to many modifications without departing from the scope and spirit of the claims as recited herein.

What is claimed is:

1. A water purification system for reducing pollutants in surface runoff water that has been washed into the fluid flow of the flow stream of a drainage channel, comprising:
    a) a tank member in fluid communication with said flow stream, said tank member having an axis of elongation, an upstream end, and a downstream end axially removed from and in fixed spaced relationship with said upstream end, and where said tank member has an inlet port contained in said upstream end and an outlet port contained in said downstream end;
    b) an open reservoir region bounded by said tank member and contained therein where said open reservoir region communicates with said inlet port and said outlet port, and where said outlet port is so disposed in said downstream end to permit said surface runoff water to pool in said reservoir region;
    c) a bioremediation plant disposed in said reservoir region having the property of removing pollutants from said surface runoff water pooled in said reservoir region; and
    d) dam means disposed in said drainage channel and located in the flow stream upstream of said inlet port for directing at least in part the fluid flow of said flow stream into said inlet port.

2. The water purification system recited in claim 1 further comprising a second tank member disposed downstream of said tank member having an axis of elongation, a second upstream end, and a second downstream end axially removed from said second upstream end, said second upstream end having a second inlet port in communication with said open reservoir region of said tank member, and where said second tank member contains a second open reservoir region bounded within said second tank member and in communication with said second inlet port to permit said surface runoff water to flow from said open reservoir region to said second open reservoir region, said second tank member further having a second outlet port so disposed in said second downstream end to permit said surface runoff water to pool in said second reservoir region; and a bioremediation plant disposed in said second reservoir region having the property of removing pollutants from said surface runoff water pooled in said second reservoir region.

3. The water purification system recited in claim 2 further comprising a third tank member disposed downstream of said second tank member having an axis of elongation, a third upstream end and a third downstream end axially removed from said third upstream end, said third upstream end having a third inlet port in communication with said second reservoir region, and where said third tank member contains a third reservoir region bounded within said third tank member and in communication with said third inlet port to permit said surface runoff water to flow from said second reservoir region to said third reservoir region, said third tank member further having a third outlet port so disposed in said third downstream end to permit said surface runoff water to pool in said third reservoir region; and a bioremediation plant disposed in said third open reservoir region having the property of removing pollutants from said surface runoff water pooled in said third reservoir region.

4. The water purification system recited in claim 3 where said tank member comprises a laterally extending upstream wall forming said upstream end and a laterally extending downstream wall forming said downstream end, and an axially extending bottom wall integral with said upstream and downstream walls, and a pair of side walls integral with said bottom wall and said upstream and downstream walls forming a boundary of said open reservoir region.

5. The water purification system recited in claim 4 where said second tank member comprises a laterally extending second upstream wall forming said second upstream end and a laterally extending second downstream wall forming said second downstream end, an axially extending second bottom wall integral with said second upstream and downstream walls, and a pair of second side walls integral with said second bottom wall and said second upstream and downstream walls forming a boundary of said second reservoir region.

6. The water purification system recited in claim 3 where said bioremediation plant is an aquatic macrophyte.

7. The water purification system recited in claim 2 further comprising a third tank member disposed downstream of said second tank member having an axis of elongation, a third upstream end, and a third downstream end axially removed from said third upstream end, said third upstream end having a third inlet port in communication with said open second reservoir region of said second tank member, and where said third tank member contains a third open reservoir region bounded within said third tank member and in communication with said third inlet port to permit said surface runoff water to flow from said second open reservoir region to said third open reservoir region, said third tank member further having a third outlet port so disposed in said third downstream end to permit said surface runoff water to pool in said third reservoir region; and a bioremediation plant disposed in said third reservoir region having the property of removing pollutants from said surface runoff water pooled in said third reservoir region.

8. The water purification system recited in claim 2 where said bioremediation plant is an aquatic macrophyte.

9. The water purification system recited in claim 8 where said bioremediation plant is an aquatic macrophyte selected from the group consisting of eichhornia crasspies, lemna minor, lemna gibba, azolla filiculoides, azolla pinnata, elodea densa, elodea canadeusis, pistia stratiotes, and ceratophyllum demersum.

10. The water purification system recited in claim 1 further comprising a mesh screen to cover said open reservoir region where said mesh screen is so dimensioned and proportioned to substantially screen the passage of flood water debris through said mesh screen into said open reservoir region and to retain said bioremediation plant within said open reservoir region.

11. The water purification system recited in claim 1 where said bioremediation plant is an aquatic macrophyte.

12. The water purification system recited in claim 11 where said bioremediation plant is an aquatic macrophyte selected from the group consisting of *eichhornia crasspies, lemna minor, lemna gibba, azolla filiculoides, azolla pinnata, elodea densa, elodea canadeusis, pistia stratiotes*, and *ceratophyllum demersum*.

13. A water purification system for reducing pollutants in surface runoff water washed into the flow stream of a drainage channel, comprising:
  a) a multiplicity of tank members in fluid communication with said flow stream of said drainage channel where each said tank member has an axis of elongation, an upstream end having an inlet port therethrough and a downstream end having an outlet port therethrough, where said downstream end is axially removed from and in fixed space relationship with said upstream end, each said tank member further having an open reservoir region therein, where said open reservoir region in each said tank member communicates with said inlet port and said outlet port, and where each said outlet port is so positioned and disposed in said downstream end of said tank to permit said surface runoff water entering into said open reservoir region through said inlet port to pool therein; and a bioremediation plant disposed in each said open reservoir region having the property of removing pollutants from said surface runoff water pooled in said open reservoir region; and dam means disposed in said drainage channel and located in said flow stream upstream of said inlet ports for directing at least in part the fluid flow of said flow stream into at least one of said inlet ports.

14. The water purification system for reducing pollutants in surface runoff water recited in claim 13 where at least one of said multiplicity of tank members comprises a laterally extending upstream wall forming said upstream end and a laterally extending downstream wall forming said downstream end, an axially extending bottom wall integral with said upstream and downstream walls, and a pair of side walls integral with said bottom wall and said upstream and downstream walls forming a boundary of said open reservoir region.

15. The water purification system for reducing pollutants in surface runoff water recited in claim 13 where each said tank member is co-axially positioned within said drainage channel in series and where each said inlet and outlet port of each said tank member are so positioned and disposed therein to permit said open reservoir regions to be in fluid communication thereby permitting said surface runoff water to enter each said tank member.

16. The water purification system for reducing pollutants in surface runoff water recited in claim 13 where said each tank member is co-axially positioned adjacent said drainage channel in series, and where each said inlet and outlet port of each said tank member are so positioned and disposed therein to permit said open reservoir regions to be in fluid communication thereby permitting said surface runoff water to enter each said tank member, said system further comprising an inlet conduit communicating with said inlet port of said tank member most upstream of said series and a discharge conduit in communication said outlet port of said tank member most downstream of said series.

17. The water purification system for reducing pollutants in surface runoff water recited in claim 13 further comprising a mesh screen to cover said open reservoir region where said mesh screen is so dimensioned and proportioned to substantially screen the passage of flood water debris into said open reservoir region and to retain said bioremediation plant within said open reservoir region.

18. The water purification system recited in claim 17 where said bioremediation plant is an aquatic macrophyte.

19. The water purification system recited in claim 13 where said bioremediation plant is an aquatic macrophyte.

20. The water purification system recited in claim 19 where said bioremediation plant is an aquatic macrophyte selected from the group consisting of *eichhornia crasspies, lemna minor, lemna gibba, azolla filiculoides, azolla pinnata, elodea densa, elodea canadeusis, pistia stratiotes*, and *ceratophyllum demersum*.

* * * * *